(12) United States Patent
Yamamoto et al.

(10) Patent No.: US 9,461,329 B2
(45) Date of Patent: Oct. 4, 2016

(54) POWER GENERATION SYSTEM

(71) Applicants: Japan Agency for Marine-Earth Science and Technology, Kanagawa (JP); The University of Tokyo, Tokyo (JP)

(72) Inventors: Masahiro Yamamoto, Yokosuka (JP); Ken Takai, Yokosuka (JP); Tomokazu Saruhashi, Yokosuka (JP); Ikuo Sawada, Yokosuka (JP); Junichi Miyazaki, Yokosuka (JP); Takazo Shibuya, Yokosuka (JP); Kentaro Nakamura, Yokosuka (JP); Ryuhei Nakamura, Bunkyo-ku (JP); Kazuhito Hashimoto, Bunkyo (JP)

(73) Assignees: Japan Agency for Marine-Earth Science & Technology, Kanagawa (JP); The University of Tokyo, Tokyo (JP)

( * ) Notice: Subject to any disclaimer, the term of this patent is extended or adjusted under 35 U.S.C. 154(b) by 200 days.

(21) Appl. No.: 14/387,336

(22) PCT Filed: Mar. 22, 2013

(86) PCT No.: PCT/JP2013/058373
§ 371 (c)(1),
(2) Date: Sep. 23, 2014

(87) PCT Pub. No.: WO2013/146610
PCT Pub. Date: Oct. 3, 2013

(65) Prior Publication Data
US 2015/0050581 A1 Feb. 19, 2015

(30) Foreign Application Priority Data
Mar. 27, 2012 (JP) .................. 2012-071864

(51) Int. Cl.
H01M 8/20 (2006.01)
H01M 8/22 (2006.01)
(Continued)

(52) U.S. Cl.
CPC ............ *H01M 8/22* (2013.01); *E21B 41/0085* (2013.01); *E21B 47/12* (2013.01); *F03G 7/04* (2013.01); *H01M 8/20* (2013.01); *H01M 12/06* (2013.01); *H01M 12/08* (2013.01)

(58) Field of Classification Search
None
See application file for complete search history.

(56) References Cited

U.S. PATENT DOCUMENTS 8,779,932 B2 * 7/2014 Burzynski ........... E21B 33/0385
166/339
2005/0016729 A1 1/2005 Savage

FOREIGN PATENT DOCUMENTS

JP H06-138256 A 5/1994
JP H07-211330 A 8/1995
(Continued)

OTHER PUBLICATIONS

The extended European search report issued by the European Patent Office on Feb. 9, 2016, which corresponds to European Patent Application No. 13769031.9-1608 and is related to U.S. Appl. No. 14/387,336.
(Continued)

*Primary Examiner* — Jonathan Crepeau
(74) *Attorney, Agent, or Firm* — Studebaker & Brackett PC

(57) ABSTRACT

A power generation system includes a hydrothermal fluid well including a drilled hole reaching down to a hydrothermal fluid reservoir present below an ocean floor from an ocean floor surface and a casing installed in the drilled hole through a guide base on the ocean floor surface, an anode provided on a flow channel for hot water formed by the hydrothermal fluid well, a cathode provided in seawater other than the flow channel for hot water formed by the hydrothermal fluid well, and an ocean floor device that is connected with the anode and the cathode respectively and extracts generated power so as to operate. Power is easily and stably supplied on the ocean floor.

6 Claims, 3 Drawing Sheets

(51) Int. Cl.
  *E21B 41/00* (2006.01)
  *H01M 12/06* (2006.01)
  *H01M 12/08* (2006.01)
  *E21B 47/12* (2012.01)
  *F03G 7/04* (2006.01)

(56) References Cited

FOREIGN PATENT DOCUMENTS

JP 2009-281131 A 12/2009
WO 01/89014 A1 11/2001

OTHER PUBLICATIONS

International Search Report; PCT/JP2013/058373; Jun. 25, 2013.
Notification of Transmittal of Translation of the International Preliminary Report on Patentability and Translation of Written Opinion of the International Searching Authority; PCT/JP2013/058373 issued on Oct. 9, 2014.

* cited by examiner

POWER GENERATION SYSTEM

TECHNICAL FIELD

The present invention relates to a power generation system on an ocean floor.

BACKGROUND ART

Thus far, the state of the ocean floor has been monitored by providing a sensor that measures a physical quantity such as hydraulic pressure on the ocean floor (for example, Patent Literature 1).

CITATION LIST

Patent Literature

[Patent Literature 1] Japanese Unexamined Patent Application Publication No. 6-138256

SUMMARY OF INVENTION

Technical Problem

As a method for supplying power to operate a device such as a sensor provided on the ocean floor, there is a method in which a battery is embedded in the device in advance. However, in this method, in a case in which the power of the battery is fully consumed, it is not possible to operate the device, and generally, the battery is not a component that is capable of withstanding use for months or years. In addition, it is possible to consider a method in which the device is connected to a power supply source on the sea or on the ground through a cable, and power is supplied to the device through the cable. However, extremely high costs are required to realize this method since a longer cable becomes necessary as the location of the device installation becomes deeper.

The invention has been made in consideration of the above-described problem, and an object of the invention is to provide a power generation system capable of easily and stably supplying power on the ocean floor.

Solution to Problem

To achieve the above-described object, a power generation system according to an embodiment of the invention comprises a hydrothermal fluid well including a drilled hole reaching down to a hydrothermal fluid reservoir present below the ocean floor from the ocean floor surface and a casing installed in the drilled hole through a guide base on the ocean floor surface, an anode provided on a flow channel for hot water formed by the hydrothermal fluid well, a cathode provided in seawater other than the flow channel for hot water formed by the hydrothermal fluid well, and power extraction means that is connected with the anode and the cathode respectively and extracts generated power.

In the hot water from the hydrothermal fluid reservoir present below the ocean floor, sulfide ions and the like are contained, and an anode reaction occurs more easily compared with the seawater other than the hot water. That is, a potential gradient, that is, an electromotive force is generated between the hot water and the seawater other than the hot water. Therefore, when an anode is provided on the flow channel for hot water formed by the hydrothermal fluid well, a cathode is provided in the seawater other than the flow channel for the hot water, and the anode and the cathode are connected with each other as in the power generation system according to an embodiment of the invention, a current flows, and thus power can be extracted. Since the power generation system according to the embodiment of the invention can be realized when the hydrothermal fluid well is provided on the ocean floor, and the anode, the cathode, and the power extraction means are provided at predetermined locations, it is possible to easily realize the power generation system. In addition, the power generation system according to the embodiment of the invention extracts power using an electromotive force that is naturally present due to hot water from the hydrothermal fluid reservoir, and is capable of extracting power as long as hot water is present, and therefore it is possible to stably extract power. That is, according to the power generation system of the embodiment of the invention, it is possible to easily and stably supply power on the ocean floor.

The anode may be detachably provided in the casing. According to this configuration, it is possible to reliably provide the anode on the flow channel for the hot water formed by the hydrothermal fluid well, and to easily maintain the anode.

At least one of the anode and the cathode may have any shape of a brush shape, a pleated shape, and a sponge shape. In addition, at least one of the anode and the cathode may have a surface covered with porous particles or ultrafine particles. Alternatively, at least one of the anode and the cathode may have a catalyst layer on the surface. According to these configurations, it is possible to more reliably and efficiently cause an anode reaction or a cathode reaction, and to more reliably and efficiently extract power.

The guide base may include legs having an adjustable length. According to this configuration, it is possible to appropriately install the guide base on the ocean floor surface even when the ocean floor surface is inclined or uneven.

Advantageous Effects of Invention

Since the embodiment of the invention can be realized when the hydrothermal fluid well is provided on the ocean floor, and the anode, the cathode, and the power extraction means are provided at predetermined locations, it is possible to easily realize the power generation system. In addition, since the embodiment of the invention extracts power using the electromotive force that is naturally present due to hot water from the hydrothermal fluid reservoir, and is capable of extracting power as long as hot water is present, it is possible to stably extract power. That is, according to the embodiment of the invention, it is possible to easily and stably supply power on the ocean floor.

DESCRIPTION OF EMBODIMENTS

Figure 1:
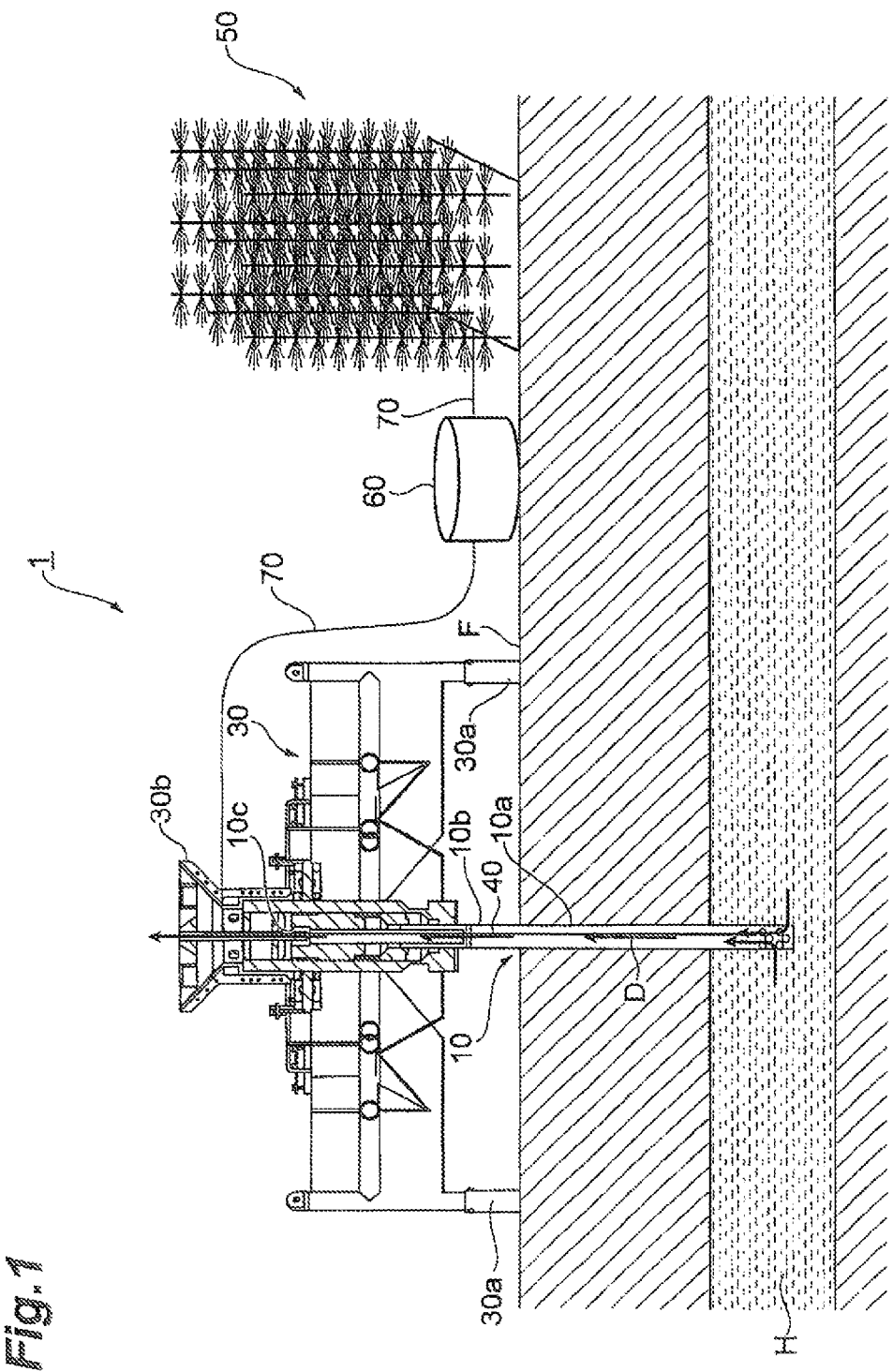
FIG. 1 is a configuration view of a power generation system according to an embodiment of the invention.

Hereinafter, an embodiment of a power generation system according to the invention will be described in detail together with the accompanying drawings. Meanwhile, in the description of the drawings, similar components will be given similar reference signs, and duplicate description will not be made. In addition, the dimensional ratios in the drawings do not always coincide with those in the description.

FIG. 1 illustrates a power generation system 1 according to the present embodiment. The power generation system 1 is a system that is provided on the ocean floor and extracts power (generates power) on the ocean floor. The extracted power is used to operate an ocean floor device 60 which operates on the ocean floor. As illustrated in FIG. 1, the power generation system 1 is configured to have a hydrothermal fluid well 10, a guide base 30, an anode 40, a cathode 50, the ocean floor device 60, and a cable 70. Meanwhile, a cross-sectional view of the hydrothermal fluid well 10 is illustrated in FIG. 1.

The hydrothermal fluid well 10 includes a drilled hole 10a reaching down to a hydrothermal fluid reservoir H present below the ocean floor from the ocean floor surface F and a casing pipe (casing) 10b installed in the drilled hole 10a. The hydrothermal fluid well 10 can be installed using, for example, the scientific deep sea drilling vessel 'CHIKYU' operated by Japan Agency For Marine-Earth Science And Technology. The depth of the hydrothermal fluid well 10 is dependent on the location of the hydrothermal fluid reservoir H, the hardness of rocks, the depth of the sea, and the like, and can be set in a range of 30 m to 1000 m.

The guide base 30 is provided so that a drill bit and a drilling pipe can be vertically inserted from a drilling vessel such as 'CHIKYU' during drilling, and furthermore, is installed on the ocean floor surface F to insert and fix the casing pipe 10b into the drilled hole drilled using the drill bit. The guide base 30 includes three legs 30a having an adjustable length. The adjustment of the lengths of the legs 30a enables the drill bit, the drilling pipe and furthermore, the casing pipe to be inserted beneath the ocean floor vertically from the drilling vessel even when the ocean floor surface F is inclined or uneven.

A mineral-cultivating machine may be installed on the top side of the guide base 30 in a state of FIG. 1 to precipitate minerals from hot water ejecting from a mine mouth 10c of the hydrothermal fluid well 10. Specifically, the guide base 30 may include a diameter-increasing section 30b for installing the mineral-cultivating machine on a top section.

The anode 40 is an electrode (negative electrode) provided on the flow channel for hot water from the hydrothermal fluid reservoir H formed by the hydrothermal fluid well 10. When the hydrothermal fluid well 10 is provided, the hot water from the hydrothermal fluid reservoir H flow upward through the hydrothermal fluid well, and ejects into the seawater as illustrated using an arrow D in FIG. 1. The hot water contains sulfide ions and the like, and an anode reaction occurs more easily compared with the seawater other than the hot water. The anode 40 is provided to cause an anode reaction in the power generation system 1. For example, electrons flow into the anode 40 from a sulfide ion ($S^{2-}$) in the hot water, and the sulfide ion turns into an inorganic sulfur intermediate oxide such as elemental sulfur ($S^0$).

The anode 40 is provided in the casing pipe 10b in the hydrothermal fluid well 10 which serves as the flow channel for the hot water. For example, a long member is used as the anode 40, and the anode 40 is preferably installed along the shaft direction of the casing pipe 10b in order to increase the contact efficiency with the hot water and cause the anode reaction across a wide range. The anode 40 is preferably fixed to the casing pipe 10b so as to prevent the anode from being moved by the flow of the hot water. In addition, it is preferable to detachably provide the anode 40 in the casing pipe 10b so that the anode can be exchanged when deteriorated. When the above-described configuration is employed, it is possible to reliably provide the anode 40 on the flow channel for the hot water formed by the hydrothermal fluid well 10, and to easily maintain the anode 40.

The disposition location of the anode 40 is not necessarily inside the casing pipe 10b, and it is possible to set the disposition location of the anode 40 to an arbitrary location as long as the location is on the flow channel (including the flow channel in the seawater) for the hot water.

The cathode 50 is an electrode (positive electrode) provided in the seawater other than the flow channel for hot water formed by the hydrothermal fluid well 10. The cathode 50 is connected with the anode 40 through the ocean floor device 60 using the cable 70. The cathode 50 is provided to cause a cathode reaction in the power generation system 1. For example, in the cathode 50, electrons are accepted by oxygen ($O_2$) in the seawater, and water ($H_2O$) or hydrogen peroxide ($H_2O_2$) is generated.

The cathode 50 is provided, for example, at a location in the seawater which is several meters away from the hydrothermal fluid well 10 and is not affected by the hot water. For example, a brush-shaped member is used as the cathode 50, and the cathode 50 is preferably installed so as to be broadly spread in a space over the ocean floor surface F in order to increase the contact efficiency with the seawater and cause a cathode reaction across a wide range. The cathode 50 is preferably fixed to the ocean floor surface F so as to prevent the cathode from being moved by the flow of the seawater.

As a material (the quality of the material) for the anode 40 and the cathode 50, it is possible to use, for example, a carbon material (graphite, graphene, or carbon nanotube), titanium, platinum, platinum graphite, platinum palladium, a metal carbide (tungsten carbide, molybdenum carbide, or the like), a metal oxide (cobalt oxide, manganese oxide, or nickel oxide), or a metal sulfide (iron sulfide, copper sulfide, silver sulfide, zinc sulfide, or the like). In addition, the anode 40 and the cathode 50 can be configured using an arbitrary material (the quality of the material) available as an electrode other than the above-described materials. (Either or both) the anode 40 and the cathode 50 may have a catalyst layer (metal porphyrin or the like) on the surface of the above-described material to more effectively cause the reaction.

Figure 2:
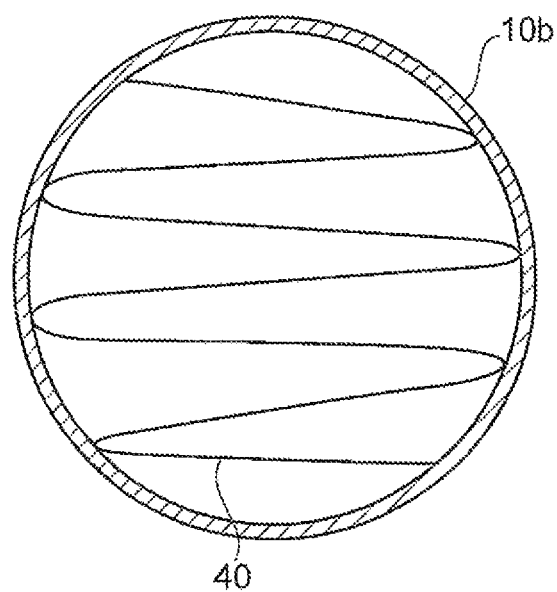
FIG. 2 is a view illustrating an aspect of an anode in the embodiment.

(Either or both) the anode 40 and the cathode 50 may have any shape of a brush shape, a pleated shape, and a sponge shape to increase the surface area so as to more effectively cause the reaction. For example, FIG. 2 illustrates an example of the shape of the anode 40. FIG. 2 illustrates a cross-sectional view of the anode on a surface perpendicular to the shaft direction of the casing pipe 10b. As illustrated in FIG. 2, the anode 40 is provided in the casing pipe 10b by bending a sheet-shaped member in a pleated shape. Alternatively, the anode 40 may have a configuration in which the anode is attached to the inner circumferential surface of the casing pipe 10b in a sheet shape. In addition, the anode 40 and the cathode 50 having a surface covered with porous particles or ultrafine particles may be used to increase the specific areas. When the above-described attempts are made, it is possible to more reliably and efficiently cause the anode reaction and the cathode reaction, and to more reliably and efficiently extract power.

In the hot water-ejecting region in the deep sea, the electrode is expected to be severely corroded. However, the inventors of the invention confirm that a sulfide mineral generated through sedimentation and crystallization in a hot water hole has excellent characteristics of an electrode. That is, a sulfide mineral is gradually deposited at the electrode (anode 40) installed in the hydrothermal fluid well 10, and a deposited substance exhibits excellent electrode characteristics that are similar to or better than those of the original electrode, whereby the capability of the power generation system 1 is maintained.

The ocean floor device 60 is power extraction means that extracts the power generated from the reactions at the anode 40 and the cathode 50 respectively. The ocean floor device 60 is connected with the cable 70 through which currents from the reactions at the anode 40 and the cathode 50 respectively flow. The ocean floor device 60 extracts power from the currents that are generated by the anode reaction in the anode 40 and the cathode reaction in the cathode 50, and flow in the cable 70. The ocean floor device 60 is an apparatus that is operated with the extracted power to, for example, monitor (observe) the periphery of the hydrothermal fluid well 10. Specific examples thereof include a camera, a light, and a sensor (that measures hydrogen sulfide, oxygen, the temperature, the ph and the like in the periphery of the hydrothermal fluid well 10). While depending on the type of the ocean floor device, the ocean floor device 60 is preferably fixed to the ocean floor surface F so as to prevent the ocean floor device from being moved by the flow of the seawater.

The power extraction means is not necessarily the ocean floor device 60 that operates on the ocean floor, and may be configured as, for example, a power supply that supplies power to the ocean floor device. Alternatively, the power extraction means may be used as a power supply that supplies power to a device on the sea or on the ground. The extracted power may be temporarily stored in a battery or the like. In addition, the extracted power may be used as a power supply for an AUV (Autonomous Underwater Vehicle), an ROV (Remotely Operated Vehicle), and the like.

The cable 70 is a conductor which connects between the anode 40 and the cathode 50 through the ocean floor device 60 and through which the currents from the reactions in the anode 40 and the cathode 50 respectively flow. What has been thus far described is the configuration of the power generation system 1.

As described above, a potential gradient, that is, an electromotive force is generated between the hot water and the seawater other than the hot water. For example, an electromotive force of approximately 800 mV is generated between the inside and the outside of the hot water. Therefore, a current flows between the anode 40 and the cathode 50, whereby power can be extracted.

Figure 3:
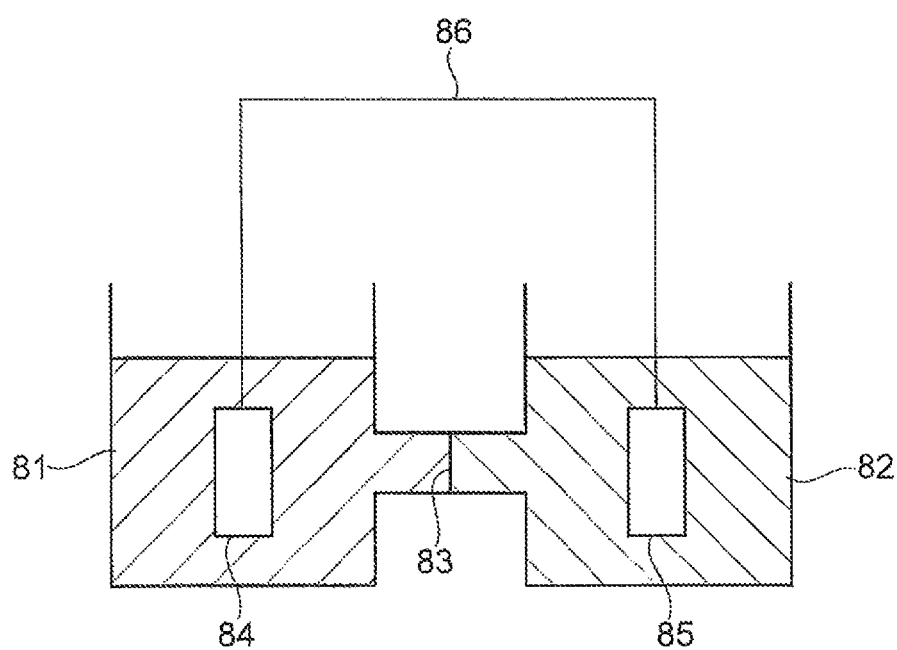
FIG. 3 is a view for describing feasibility of the invention.

An experimental example in which the inventors of the invention confirm the flow of a current in the power generation system 1 is illustrated using FIG. 3. A container contains a solution 81 that is a simulated the hot water from the hydrothermal fluid reservoir H present below the ocean floor. The solution 81 is a solution of 0.6 M NaCl and 0.1 M $Na_2S$ with pH 7.5. Another container contains a solution 82 that is a simulated the seawater. The solution 81 is a solution of 0.6 M NaCl with pH 7.5. The respective containers are separated by an electric cell membrane 83.

Electrodes 84 and 85 are included in the respective solutions. The electrodes 84 and 85 are connected with each other using a conductive wire 86. The electrodes 84 and 85 are chimneys that are generated through the precipitation and sedimentation of metal and the like contained in the hot water ejecting from the ocean floor. In the above-described example, it was confirmed that a voltage of 0.538 V and a current of 2.31 mA were generated between the electrodes 84 and 85.

As is evident from the above-described example, in the power generation system 1 according to the embodiment, a voltage and a current are generated, and power can be extracted. In addition, it is found that a precipitate from the hot water can be used as the electrode as described above.

In the power generation system 1 according to the above-described embodiment, 2.4 W of power is extracted (generated) per square meter (area) of the anode 40 and the cathode 50. Power of approximately 500 W is extracted (generated) in one hydrothermal fluid well 10 (artificial hot water), and power of approximately 50 kW is extracted (generated) in one hydrothermal field.

Since the power generation system 1 according to the embodiment can be realized when the hydrothermal fluid well 10 is provided on the ocean floor, and the anode 40, the cathode 50, and the ocean floor device 60 that is the power extraction means, all of which are connected with each other, are provided at predetermined locations, it is possible to easily realize the power generation system. In addition, since the power generation system 1 according to the embodiment extracts power using the electromotive force that is naturally present due to hot water from the hydrothermal fluid reservoir, and is capable of extracting power as long as hot water is present, it is possible to stably extract power. That is, according to the power generation system 1 of the embodiment, it is possible to easily and stably supply power on the ocean floor.

In addition, both the hot water around the anode 40 and the seawater around the cathode 50 are continuously exchanged with new hot water and new seawater, and thus the electromotive force is not decreased. Therefore, in the power generation system 1 of the embodiment, high power supply performance is maintained.

In addition, except for the installation of a facility, the drilling of a portion of the hydrothermal fluid reservoir H is all that is required for carrying out the power generation system 1 according to the embodiment, and therefore it is possible to suppress the influence on the ocean floor and the ocean environments at an extremely low level. Furthermore, the hot water sustainably ejects as long as the hot water activity from the hydrothermal fluid well 10 continues. Therefore, for example, when the ocean floor device 60 is used as the power extraction means as in the above-described embodiment, it is not necessary to supply power from a device on the sea or on the ground, and to include a battery or the like (of the related art), and it becomes possible to sustainably (for example, for ten years with no maintenance effort) monitor the periphery of the hydrothermal fluid well 10.

INDUSTRIAL APPLICABILITY

According to the embodiment of the invention, it is possible to easily and stably supply power on the ocean floor.

REFERENCE SIGNS LIST

1 . . . POWER GENERATION SYSTEM, 10 . . . HYDROTHERMAL FLUID WELL, 10*a*. . . DRILLED HOLE, 10*b*. . . CASING PIPE, 10*c*. . . MINE MOUTH, 30 . . . GUIDE BASE, 40 . . . ANODE, 50 . . . CATHODE,

60 . . . OCEAN FLOOR DEVICE, 70 . . . CABLE, F . . . OCEAN FLOOR SURFACE, H . . . HYDROTHERMAL FLUID RESERVOIR

The invention claimed is:

1. A power generation system comprising:
 a hydrothermal fluid well including a drilled hole reaching down to a hydrothermal fluid reservoir present below an ocean floor from an ocean floor surface and a casing installed in the drilled hole through a guide base on the ocean floor surface;
 an anode provided on a flow channel for hot water formed by the hydrothermal fluid well;
 a cathode provided in seawater other than the flow channel for hot water formed by the hydrothermal fluid well; and
 power extraction means that is connected with the anode and the cathode respectively and extracts generated power.

2. The power generation system according to claim 1, wherein the anode is detachably provided in the casing.

3. The power generation system according to claim 1, wherein at least one of the anode and the cathode has any shape of a brush shape, a pleated shape, and a sponge shape.

4. The power generation system according to claim 1, wherein at least one of the anode and the cathode has a surface covered with porous particles or ultrafine particles.

5. The power generation system according to claim 1, wherein at least one of the anode and the cathode has a catalyst layer on the surface.

6. The power generation system according to claim 1, wherein the guide base includes legs having an adjustable length.

* * * * *